United States Patent [19]
Galyon

[11] Patent Number: 5,592,774
[45] Date of Patent: Jan. 14, 1997

[54] TERMITE ACTIVITY REMOTE MONITORING AND INFORMATION SYSTEM

[75] Inventor: Stanley D. Galyon, Maynardville, Tenn.

[73] Assignee: Nisus Corp., Knoxville, Tenn.

[21] Appl. No.: 195,856

[22] Filed: Feb. 10, 1994

[51] Int. Cl.$^6$ .................................................. A01M 1/20
[52] U.S. Cl. .................................................. 43/124; 43/131
[58] Field of Search ........................... 43/124, 131, 132.1

[56] References Cited

U.S. PATENT DOCUMENTS

| | | |
|---|---|---|
| 3,564,750 | 2/1971 | Burgess . |
| 3,624,953 | 12/1971 | Crosby ......................... 43/124 |
| 3,743,581 | 7/1973 | Cady et al. . |
| 3,858,346 | 1/1975 | Bailey . |
| 3,909,975 | 10/1975 | Basile . |
| 3,940,875 | 5/1976 | Basile . |
| 3,943,750 | 5/1976 | McLaughlin . |
| 4,809,554 | 5/1989 | Shade et al. . |
| 4,812,741 | 5/1989 | Stowell . |
| 4,937,555 | 7/1990 | Litzkow et al. . |
| 4,941,356 | 7/1990 | Pallaske . |
| 5,005,416 | 4/1991 | Vick et al. ......................... 73/587 |
| 5,094,028 | 3/1992 | Hume . |
| 5,126,679 | 6/1992 | Spry . |
| 5,285,688 | 2/1994 | Robbins et al. ......................... 73/587 |
| 5,329,726 | 7/1994 | Thorne et al. ......................... 43/124 |

OTHER PUBLICATIONS

"PCT" (Pest Control Technology)—Jun. 1993.
"PCT" (Pest Control Technology)—Jun. 1993.
"PCT" (Pest Control Technology)—Jul. 1993.
"SC32A RS–232 Interface", Campbell Scientific, Inc.—Aug. 1993.
"Data Storage Modules", Campbell Scientific, Inc., Feb. 1993.
"EasyLogger", OMNIDATA, Oct. 1992.
"600 Polycorder Series", OMNIDATA, Sep. 1989.
"The International Research Group on Wood Preservation", Nan–Yao Su and Rudolf Scheffrahn, Apr. 2, 1991.
"Professional Equipment PCO Edition", Professional Equipment.
"CR 10 Measurement & Control System, Campbell Scientific, Inc.—Dec., 1992".
"Am416 Multiplexer", Campbell Scientific, Inc., Feb., 1991.
"Data Storage and Transfer Peripherals":, Campbell Scientific, Inc., Jul. 1993.
"Polycorder 286LX", OMNIDATA International, Inc.
"Power Supplies", Campbell Scientific, Inc., Apr. 1993.
"Data Storage and Transfer Peripherals":, Campbell Scientific, Inc., Jul. 1993.
"Model 223 Delmhorst Cylindrical Soil Moisture Block".
"Model 227 Delmhorst Cylindrical Soil Moisture Block".
"Campbell Scientific Software", Campbell Scientific, Inc., Nov. 1991.
"Digital Soil Moisture Tester", Delmhorst Instrument Co.
"Model 227 Delmhorst Cylindrical Soil Moisture Block".

*Primary Examiner*—Chuck Y. Mah
*Attorney, Agent, or Firm*—Lerner, David, Littenberg, Krumholz & Mentlik

[57] ABSTRACT

The present invention relates to a method and system for use in determining the presence of termites and controlling termite population. The system and method utilized changes in, for example, conductivity, as a method of determining termite activity.

19 Claims, 2 Drawing Sheets

TERMITE ACTIVITY REMOTE MONITORING AND INFORMATION SYSTEM

FIELD OF THE INVENTION

The present invention relates to the field of subterranean termite detection and control and specifically to sensors, sensing systems and methods for their use in the detection and control of termites.

BACKGROUND OF THE INVENTION

Termite control is a complicated problem made more difficult by competing societal goals and objectives. Termites are highly mobile, exist in great numbers, and depending on the geography, tend to live in multiple colonies per acre. This coupled with the fact that termites tend to, at least initially, be most active near or under ground level, renders termite detection and control difficult.

In the past, compounds such as chlordan(e) (1, 2, 4, 5, 6, 7, 8, 8-Octachloro-2, 3, 3a, 4, 7, 7a-hexahydro-4, 7-methano-1H-indene) were applied at or near the base of wooden structures. Chlordan(e) provided an efficacious level of protection. However, chlordan(e) tended to migrate into ground water. In addition, regrettably, chlordan(e) was at least somewhat toxic to humans in addition to its relatively high level of termite toxicity. Toxicity in humans resulted in, in mild cases, moderate skin irritation and, in other, more serious situations, irritability, convulsions, deep depression, degenerative liver disease and poisoning. For this reason, the EPA cancelled the registration of chlordan(e) and its use has dwindled, particularly in the United States.

Unfortunately, chlordan(e) was the single most efficacious chemical for controlling termites, and in particular, limiting their damage to structures. Other termiticides or toxicants have followed. However, for one reason or another, none have been able to match chlordan(e)'s efficacy. Some new generation toxicants attempted to overcome chlordan(e)'s problems by binding with organic matter. However, this tends to leave "gaps" in the soil barrier resulting in lower efficacy.

A number of other technologies have also been employed as a substitute for using treatments at or near the base of structures. Principal amongst these is the use of termite baits. Baits are attractants which can be buried just under the surface, throughout a property. The baits should preferentially attract termites to the bait as opposed to a wood structure. Often baits include various termiticides or toxicants which are carried by termites back to their colonies so that both the foraging termites and the non-foraging termites may be killed.

Baits have a number of problems. First, termites are random opportunistic foragers. Therefore, they are almost as likely to attack a wood structure as they are to attack a bait station. Second, there are advantages and disadvantages to making baits strong enough to attract termites. A bait should be strong enough to draw termites away from a building. However, it should not be so strong that termites are attracted from surrounding acreage and unnecessarily brought into the proximity of the building. As will be readily appreciated, a difficult balance must be struck. Finally, baits are exposed to extremes of weather and soil conditions and environmental concerns with regard to the leaching of termiticides as well as efficacy concern with regard to the leaching of the attractant remain ever present.

In addition, a review of the known bait technology demonstrates that baits actually do very little to attract termites. See *Pest Control Technology*, July 1993, pgs. 72 et seq. In fact, subterranean termites may not be attracted even when they are an inch or less away from the bait. In truth, all a bait can do is provide another source of attack for termites. Of course, because of the presence of the toxicants, termites which happen to attack a bait source will be killed as will other termites back in the colony due to trophyllaxis. Thus bait stations can be effective as part of an overall plan to reduce the number of termites in a given acre. But as a defense strategy for a particular dwelling, baits certainly cannot stand alone.

Other methods used for termite detection and/or control include U.S. Pat. No. 3,564,750, which includes a form of baited trap which when actuated, discharges an insecticide onto the termites. A frangible insecticide container is mounted in an enclosed chamber and a projectile is held under spring tension by a consumable trigger means. When the trigger means is consumed by termites, the projectile is released which then breaks the container to discharge the insecticide. Signal devices associated with the trap indicate that the structure has been attacked by termites. This signal means is actuated when the trigger is released interrupting an electrical signal. U.S. Pat. No. 3,624,953 relates to a termite control system which includes an insecticide dispensing pipe which is vertically disposed within a hole adjacent to a dwelling. The pipe has a low unperforated portion for receiving a liquid insecticide and an upper portion having perforations through which the insecticide is dispensed in vapor form. A sleeve is provided at the upper end of the hole for mounting the pipe with its outer surface spaced inwardly from the walls of the hole so that the insecticide in vapor form may permeate the soil surrounding the hole.

U.S. Pat. No. 3,858,346 relates to the control of subterranean termites by impregnating the exposed lower timbers of the building a termiticidally effective amount of hexachlorocyclopentadene dimer in a liquid organic solvent carrier. U.S. Pat. No. 3,940,870 relates to a method of treating soil for controlling termites and the like. The method involves dispensing a termite toxic insecticide into soil in an active available state. In addition, an initially unavailable insecticide which is enveloped in the container made from material which is attractive to and edible by termites is provided to release insecticide when the container or a part thereof is eaten by termites. An odoriferous material is provided along with the initially unavailable insecticide whose release will signal the presence of termites.

U.S. Pat. No. 5,094,028 relates to a termite blocking system which introduces a non-toxic, termite-repelling, hygroscopic material such as salt into the pathways of subterranean termites. U.S. Pat. No. 4,809,554 relates to an apparatus and method for detecting insects by detecting ultrasonic signals which are generated by mechanical disturbances in material upon which insects are feeding. U.S. Pat. No. 4,937,555 relates to a piezoelectric apparatus and process for detecting insects in agricultural commodities. An electrical signal is generated in response to vibration of a certain frequency caused in an agricultural commodity. U.S. Pat. No. 4,941,356 relates to a process for detecting insects in wood by comparing the behavior patterns to actual noise and vibration patterns detected in the wood substrate after extraneous noise is filtered out. U.S. Pat. No. 5,005,416 relates to insect detection using a pitfall probe trap having a vibration detector. U.S. Pat. No. 3,909,975 relates to a method of soil treatment where a network of interconnected rigid or collapsible perforated pumps were installed below ground such as before the erection of a wood containing structure and an inlet pipe extends from the network to an accessible point. A solution or emulsion of a termiticide is pumped under pressure through the inlet pipes to impregnate the ground underlying and around the structure.

U.S. Pat. Nos. 4,812,741 and U.S. Pat. No. 5,126,679 relate to moisture monitoring systems. U.S. Pat. No. 3,943,750 relates to a probe elector for subterranean gases. U.S. Pat. No. 3,753,581 relates to a microbiological detection apparatus useful for determining the growth of microorganisms. The system operates by measuring electrical conductivity changes in sealed cells having selected varieties of nutrient media inoculated with a sample containing expected microbial contamination.

It is also known by some pest control operators that a moisture detector can be used when inspecting the actual wood of a structure. The presence of moisture may be a sign of termites. In this case, the moisture detector only provides a reason to check further.

Another problem in termite control is the substantial lack of convenient and accurate diagnostic and quantification techniques. The commonly accepted laboratory method of documenting baiting efficiency is to use a triple mark, release and recapture system which statistically documents the reduction in termite populations. Unfortunately, this method is quite complex and beyond the capability of almost all professional pest control operators. It is both time and labor intensive and as such, is all but preclusive in terms of routine residential or commercial use.

Under this methodology, a simple wooden stake is driven into the ground. Once termite activity is detected on the wooden stake, a collection station is then installed adjacent to the attacked stake to collect termites for marking. Marking is accomplished by the use of a dye such as Nile blue or a fluorescent paint which is applied directly to the termites. The marked termites are again released and later recaptured at the capture stations. This process is repeated three times until a baseline population number is reached to the extent that the colony foraging territory has been established. A bait toxicant can then be introduced through one or more of the collection stations. This process is then continued after the introduction of the toxicant to determine the extent of population decrease as a function of the decrease in the recapturing of marked termites.

As will be readily appreciated, this is an inexact way of determining the efficacy of the toxicants and recording and documenting the resulting decrease in population. Of course, this method is currently accepted by the Environmental Protection Agency. However, until now, there really has been no alternative. In addition, checking the stake usually involves disturbing the stake as well as feeding termites. Termites are likely to leave the stake after such a disturbance and not return.

Therefore, there remains a need to provide better, more convenient, more technologically accessible methods and devices for controlling termite population and for determining the efficacy of various toxicants, baits and/or overall termite control strategies.

The methods and devices of the present invention allow for long term monitoring either on a continuous or discrete basis in a manner which is quick, efficient, and easy enough to allow use by all levels of the pest control industry.

OBJECTS AND SUMMARY OF THE INVENTION

It is an object of the present invention to provide methods of detecting the presence of termites.

It is also an object of the present invention to provide methods which can be used to assist in the quantification of termite infestation.

It is further an object of the present invention to provide methods which can be used for testing the efficacy of various baits and/or toxicants on termites.

It is also an object of the present invention to provide methods which can be used by individual pest control operators on a residential and small scale commercial level as well as on larger scale projects.

Finally, it is an object of the present invention to provide methodologies for termite detection and control which can be practiced efficiently, both in terms of workers and materials and which can be practiced repeatedly and reliably with little training or supervision.

In accordance with these and other objects which will be readily apparent to those of ordinary skill in this art, the present invention provides a method of detecting and quantifying the infestation of termites. The method includes the steps of providing at least one sensing station including a generally impermeable housing, the housing defining a first hollow inner chamber, a first sensor capable of sensing evidence of termites and ambient environmental factors disposed within the first chamber, a means for allowing termites and ambient environmental factors access into the first chamber, and a bait disposed within the first chamber. At least one control station including a generally impermeable housing, the housing defining a second hollow inner chamber, a second sensor capable of sensing ambient environmental factors disposed within the second chamber, and a means for allowing ambient environmental factors, but not termites, access into the second chamber is also provided. The next step involves exposing the sensing station and the control station to an area of actual or possible termite infestation and detecting and analyzing physical changes within the first hollow chamber. Detection and analysis of physical changes within the second hollow chamber are also undertaken. Then, the physical changes within the first chamber caused by termite activity are determined.

In one additional embodiment, the sensing station and the control station are actually one station with two separate chambers. Termites will be able to access one chamber, but not the other chamber.

It is another object of the present invention to provide a sensing station 10 and system utilizing sensing stations 10 which can be useful in detecting the presence of and determining the amount of termite infestation.

It is also an object of the present invention to provide a system which can be useful in assisting in the control of termite infestations.

In accordance with these and other objectives which will readily be appreciated by those of ordinary skill in the art, there is provided a system for use in the determination and/or control of termite infestation. The system includes at least one sensing station having a generally impermeable housing, the housing defining a first hollow inner chamber, a first sensor capable of sensing evidence of termites and ambient environmental factors disposed within the first chamber, a means for allowing termites and ambient environmental factors access into the first chamber, and a bait disposed within the first chamber. The system also includes at least one control station having a generally impermeable housing, the housing defining a second hollow inner chamber, a second sensor capable of sensing ambient environmental factors disposed within the second chamber, and a means for allowing ambient environmental factors, but not termites, access into the second chamber. Finally, the system includes a detector operably linked to the first sensor and the second sensor.

By the practice of the present invention, it is possible to detect the presence or absence of termites in a dynamic way at relatively little expense or difficulty. In accordance with preferred aspects of the present invention, it is also possible to obtain at least an indication of the degree of infestation as well as any change in the degree of infestation. This is particularly helpful to pest control operators who cannot afford the 6 to 24 months and the material necessary to conduct a triple mark, release and recapture system for each and every residential and commercial property treated. The training, expertise, and logistics required renders such techniques useless in any meaningful way. Here, however, small changes such as moisture, methane gas, or pH within the sensing station can be detected, either continuously or discretely, from time to time, in seconds.

In a relatively simple embodiment, an operator merely drives to a specific location utilizing the system of the present invention, and reads the appropriate detectors for the presence or absence of termites. For example, if a meter is used as a detector, then the operator merely records the meter reading for each of the sensing stations and for each of the control stations and subtracts the control reading from each of the readings of the various sensing stations to arrive at a result. This result is also compared to an initial baseline established at the time of installation or after the stations have reached equilibrium. If the environmental condition within the sensors do not change from the initial reading, then the comparison can be made between either the initial baseline or the control reading. If no significant difference is determined between the readings from the sensing stations and the control stations then termite activity is unlikely. The reverse is also true.

Alternatively, using a separate moisture sensing device, the operator can take one or more moisture readings manually both initially and with each successive visit and compare the readings to the readings obtained from the sensing stations.

A more automated system is also proposed whereby an individual operator merely interfaces a portable computer with the sensing and control stations and the various readings can be taken. In fact, with the right hardware and software, it is possible to eliminate the need for the operator to manually select the individual channels for each sensor and/or first sensing station and control station.

The advantages of the latter system will be readily apparent. First, data acquisition will be a relatively quick and uncomplicated process. Second, an individual operator will not need to do calculations in the field nor be trained to do so. Manual calculations can be eliminated entirely. Finally, accurate reports can be printed up for both customers and supervisors and easily consolidated records can be kept for each and every job site. The integrity, continuity, and reproducibility of the results of such a system are highly desirable.

But perhaps the most interesting and economically advantageous aspects of the present invention almost eliminate the need for on-site inspection. After an initial system of sensing stations and control stations are installed, they are hooked into a totalizer which is a device which periodically takes readings from each sensor and control station. The intervals between readings can be fractions of seconds in length or days in length. This totalizer can be linked via a computer and computer modem and via a phone line directly to a central office and the data can be periodically downloaded directly. Only if irregular results or significant infestation are detected need an operator actually be dispatched back to the actual site. While the initial equipment costs for such a system may be somewhat more expensive, the cost savings in terms of manpower can be significant.

The present invention can also assist in mapping the areas of heaviest termite activity in an attempt to identify the source and foraging territory of various termite colonies.

BRIEF DESCRIPTION OF THE DRAWINGS

Embodiments of the present invention will be described in greater detail with reference to the accompanying drawings, wherein like members bear like reference numerals and wherein.

DETAILED DESCRIPTION OF THE PREFERRED EMBODIMENT

The system for use in the determination and/or control of termite infestation will now be defined, described and illustrated with reference to FIG. 1. The system includes at least one sensing station 10 which includes a generally impermeable housing 11. The housing defines a first hollow inner chamber 12 in which is disposed a first sensor 13 capable of sensing evidence of termites and ambient environmental factors. The housing 11 also has a first end 14 and a second end 15. First end 14 is generally sealed and is usually integrally formed as a part of housing 11. Second end 15 is usually substantially open until covered or plugged by a means 16 for allowing termites and ambient environmental factors access into the first chamber 12. Also disposed within the first chamber 12 is a bait 17.

The generally impermeable housing 11 may be of any size or shape desirable so long as it defines a first hollow chamber 12 in which sensor 13 and bait 17 are generally disposed. However, preferably the housing has the shape of, for example, an inverted tall sided cylindrical drinking glass, i.e. a hollow cylinder sealed at one end (first end 14). The second end 15 of housing 11 is generally open defining an aperture of a desired size. Housing 11 may be made of any material desirable so long as it is substantially inert, non-conductive, impermeable to moisture, gas, and other environmental conditions (except through the aperture at second end 15). Preferably, housing 11 is formed of plastic such as High Density Polyethylene (HDPE), polypropylene, PVC, polycarbonate and the like.

The aperture formed at second end 15 of housing 11 is generally occluded, plugged or covered by the means 16 for allowing termites and ambient environmental factors access into the housing 11. This means 16 may include a block of wood, a layer(s) of paper, cellulose, semi-permeable plastic membranes, and the like or metal screens of size and shape sufficient to allow termites to pass therethrough. Preferably, however, a cork plug or stopper may be used.

Preferably, bait 17 is disposed within the first hollow chamber 12 of sensing station 10. The bait 17 serves to attract termites into the interior thereof. Bait 17 also serves as the medium for measurement of physical changes brought about by the presence of feeding termites. In addition, the bait serves as a carrier or solid diluent for toxicants, termiticides and other additives which may be used within the system. For example, bait 17 may be used in combination with one or more conventional additives.

Bait 17 in accordance with the present invention may include saw dust, corn cob grit, pecan hulls, wood blocks, cardboard, paper or other cellulose based material. Corn cob grit can be particularly useful in accordance with the present invention. Corn cob grit will not require too much in the way of moisture to expand significantly. In fact, during even mild infestation, sufficient moisture may be introduced to expand the grit sufficiently to rupture the housing of a sensor. This failure will register and will also prompt immediate investigation on the part of a pest control operator, thereby assuring that infestations are not missed.

Additives as used herein may include attractants, toxicants, preservatives, humectants, etc. Attractants which may be used in accordance with the present invention include cellulosic material, extracts from decay fungi and the like. Toxicants and/or termiticides in accordance with the present invention may include those which are conventionally used. Of course, termiticides or toxicants used in accordance with the present invention should be relatively non-repellant in nature. The termiticides generally rely upon worker termites to carry them to other castes in the termite colony which do not feed directly on the wood. This therefore eliminates from consideration conventional soil termiticides such as organophosphates like DURSBAN™ and pyrethroids such as DEMON™. In addition, active ingredients for baiting systems must have a slow active toxic effect in order to give the worker termites time to spread the toxicant among other colony members before they die. Although, of course, the toxicant cannot be so slow as to be overcome by the rapid reproductive capability of the termite colony. The termiticide should also be efficient at low levels since in a typical bait station, only 2–4 grams of food is consumed in a single day.

There are several suitable materials commercially available which may be used in accordance with the present invention. Some utilize boric acid, barium metaborate, borax, disodium octaborate tetrahydrate and the like. These act as slow stomach poisons in termites. Another class of useful termiticides are best represented by HEXAFLUMORON available from Dow Chemical which is a chitin synthesis inhibitor that arrest the natural development of the termite as it grows and molts. This particular class of compounds is also known as insect growth regulators. Bacterial agents such as streptomyacin have also been shown to be effective in controlling termites in laboratory studies. Such agents act by killing the symbiotic gut protozoa which termites need to digest cellulose. Another class of compounds which can be used is best represented by chlorothalonil which is commonly used as a fungicide and a wood preservative.

The selection of various ingredients and the amounts used will vary with the different environmental factors present, the type of measurements that will be taken, and the goal of overall system. Generally, however, each station will be substantially filled, and packed reasonably tightly with the bait 17 and any other solid materials to be placed into chamber 12.

The amount of termiticide used will generally be dictated by a toxicant's manufacturers instructions. The amounts used can vary widely from a few ppm to several hundred ppm, depending on several factors.

A formula can be used to screen prospective compounds and define the optimum amount of that compound. That formula is BTE=BATC/DMTC where BTE stands for Bait Toxicity Efficiency, BATC stands for Bait Acceptance Threshold Concentration (the amount of active ingredient in a bait that results in the highest feeding rates without causing repellency or decreasing feeding) and DMTC which stands for Delayed Mortality Threshold Concentration (the amount of active ingredient that gives the fastest kill of a group of termites for a given amount of bait eaten without causing immediate mortality of those termites that consume the bait). If the BTE of a candidate toxicant is greater than one, it is desirable. If the BTE is less than one, it is generally not efficient enough to use in a bait based system.

Alternatively, as those of ordinary skill in the art will appreciate, efficiency can be examined in terms of ELT90 which stands for Effective Lethal Time 90. The ELT90 reflects the amount of time required for a given dose to kill 90% of a given termite population.

Sensor 13 in accordance with the present invention can be any sensor which is capable of detecting both evidence of termites and ambient environmental factors. These latter terms bear explanation. The present invention does not detect the presence of termites directly. Rather, the present invention detects physical changes in the interior chamber 12 of housing 11 and, more particularly, within bait 17 brought about by the presence of termites. For example, as termites ingest bait 17, methane gas is released. The detection of methane gas may, therefore, under the right circumstances, "evidence" termite activity. Similarly, as termites digest wood, they will produce waste which will change the pH environment within first chamber 12. By the use of a pH electrode as sensor 13, a change in the pH within the first chamber 12 can be detected and that change in pH "evidences" termite activity.

In accordance with the present invention, a preferred method of detecting and quantifying termites is based on a conductivity change brought about by changes in moisture level (while the present invention is described in terms of conductivity measurements, it should be understood that changes in resistance can also be measured) In fact, the two terms are interchangeable for the purposes of this invention. It is known to those dealing with termites that termites bring moisture into wood with them as they feed. See Nan-Yao Su and Rudolf Scheffrahn, "Remedial Wood Preservative Efficiency of BORA-CARE™ Against the Formosan Subterranean Termite, and Eastern Subterranean Termite (Isoptera: Rhinotermitidae)", Document No. IRG/WP/1504, prepared for the 22nd Annual Meeting in Kyoto, Japan of The International Research Group on Wood Preservation, May 20–24, 1991. Such moisture may also be due to a saliva trail created by feeding termites. The presence of this moisture changes the moisture content within first chamber 12 and within bait 17. This in turn changes the conductivity of bait 17 within the first chamber 12 of sensing station 10. The change in conductivity may be evidence of termites.

Of course, the soil on which sensing station 10 will sit or in which sensing station 10 will be buried will be subject to a number of ambient environmental conditions including moisture, pH, and possibly methane gas. These conditions can also affect the physical properties within first chamber 12. In general, the effects of these environmental conditions upon the chamber can be disregarded. However, where the evidence of termites to be determined can be affected by a specific environmental condition, then the effect of that condition must be "factored out". In such cases, the environmental condition in question is referred to as an ambient environmental factor. For example, and without limitation, if a change in conductivity resulting from a change in moisture in sensing station 10 is to be used as the basis for detecting termites, then any ambient environmental moisture must be "factored out" such that only the conductivity change resulting from moisture brought into first chamber 12 by termites is determined. In this instance, ambient moisture is an "ambient environmental factor". The ambient level of methane gas generation and/or pH, which might also be environmental conditions, are not being determined in this instance. Therefore, they remain designated as environmental conditions with regard to this system. If methane gas was the "evidence" of termites being detected, then ambient methane gas is also detectable as part of the system. In this case, ambient moisture is defined as an "ambient environmental factor".

In accordance with one aspect of the present invention, the system for use in determination and/or control of termite infestation also includes at least one control station 100. See FIGS. 1 and 2. The control station allows the system to "factor out" the ambient environmental factors which might otherwise affect the results. The control station 100 may be of a different construction than sensing station 10. However, preferably, as with any true control, it is constructed substantially identically thereto. Control station 100 therefore can be made of a generally impermeable housing 101, the housing defining a second hollow inner chamber 102 and having a second sensor 103 capable of sensing ambient environmental factors disposed within the interior of the second inner chamber 102. Control station 100 also has a first end 104 and a second end 105, second end 105 generally defining an aperture for allowing access into the interior of the second chamber 102. The aperture at second end 105 is occluded, plugged or covered by a means 106 for allowing ambient environmental factors, but not termites, access into the interior of the second chamber 102.

A bait 107 which is preferably substantially identical in composition to that of bait 17 is also included within the interior of chamber 102. In fact, in a most preferred embodiment, bait 107 will also have the same toxicants and other additives as found in bait 17 such that its properties, e.g. conductivity, are the same as bait 17 found in sensing station 10. Thus preferably, the only difference between sensing station 10 and control station 100 is the structure of means 106 for allowing ambient environmental factors, but not termites, access into second chamber 102. This can be accomplished by the use of, for example, a screen 106a or other device which is not edible and which has openings which are too small to admit termites.

Because the control station 100 utilizes means 106 for allowing ambient environmental factors, but not termites, access into second chamber 102, the level of detected ambient environmental factors present in control station 100 should be substantially identical to the level thereof found in sensing station 10. Of course, this depends upon the relative conditions and positioning of the sensing stations 10 and the control stations 100. Nevertheless, if termites are present, a difference should be discernible. It is this difference which is the evidence of termites. Thus, in the case of conductivity, the physical change in conductivity due to ambient environmental factors, in this case moisture, should be equivalent in both control station 100 and sensing station 10. However, an additional change in conductivity over the initial baseline determined at installation or shortly thereafter and/or over the reading from control stations 100 will be read at sensing station 10 if termites are present. This change in conductivity is not due to the presence of ambient moisture, but rather additional moisture brought into bait 17 by termites.

It will be understood and appreciated that the present invention provides a high degree of flexibility in terms of setup and operation. Depending on geography, weather conditions, topography, average termite activity and expense, the system can be modified and reconfigured accordingly. For example, in the simplest embodiment, and with reference to measuring conductivity based on changes in moisture, an initial moisture/conductivity reading can be taken in one or more sensing stations 10 and that reading is used as a preset baseline. Thereafter, all measurements of moisture/conductivity will be compared to the originally obtained baseline. This is done without the use of any control stations 100.

Alternatively, the initial moisture readings can be taken through other moisture sensing devices and a background moisture level established. This can then be correlated to a certain conductivity which can also be used as a baseline. Thereafter, moisture readings taken from each sensing station can be compared to the baseline.

In a slightly enhanced protocol, each time a reading is taken at sensing station 10 subsequent to the initial reading, a fresh moisture baseline can be established by retesting the surrounding area using a discrete moisture sensing device.

As an alternative, a slightly more complex system would involve the use of a single control station 100 and a plurality of sensing stations 10. In terms of moisture, this may be particularly useful for acreage which is well drained and which has a roughly homogeneous topography. Moisture conditions could therefore be expected to be relatively consistent throughout.

More preferably, a plurality of such control stations 100 would be utilized. Most preferably, however, for each sensing station 10, at least one control station 100 would be used and would be located adjacent to and preferably next to each sensing station 10.

Figure 1:
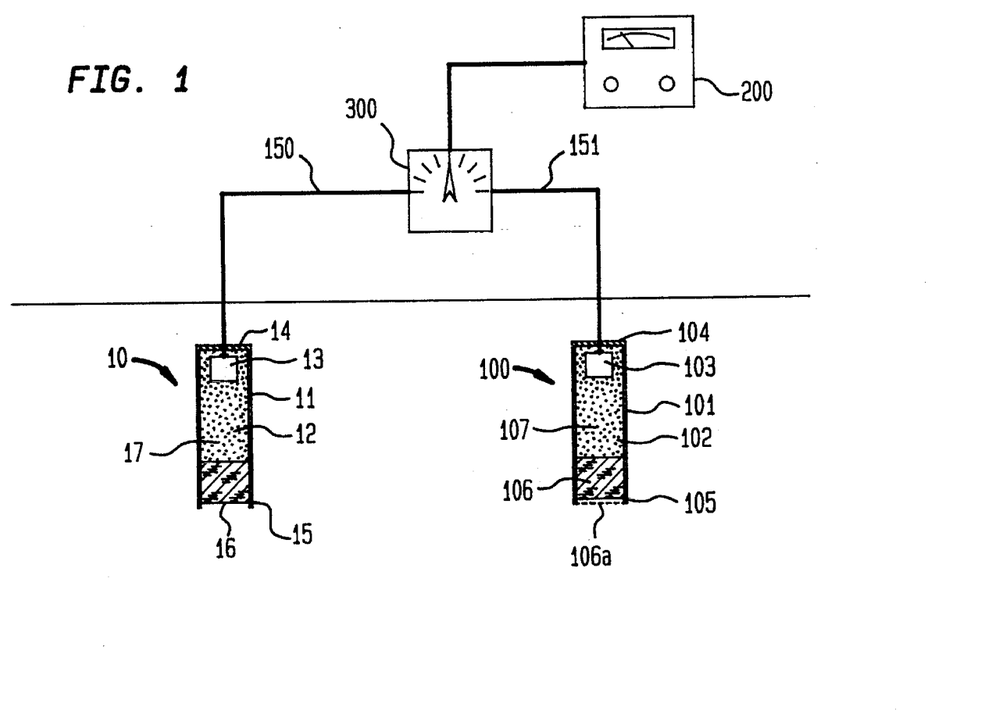
FIG. 1 is a schematic view of a sensing system in accordance with the present invention with the sensing and control stations being illustrated in cross section.
Figure 2:
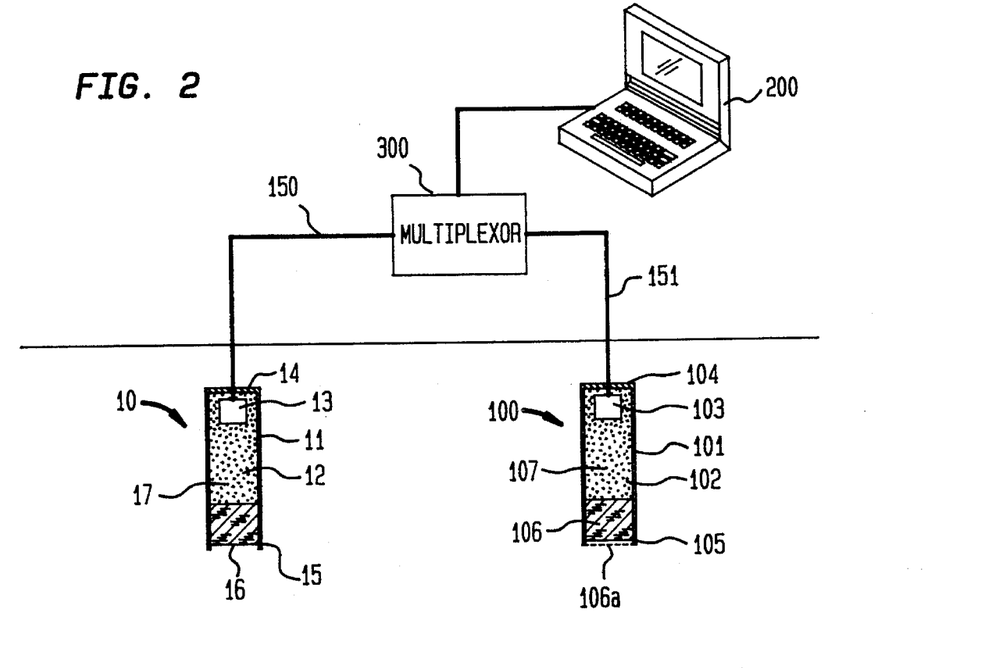
FIG. 2 is a schematic view of the sensing system illustrated in FIG. 1, where a totalizer or multiplexer and computer are used as channel selector and detector.

As shown in FIGS. 1 and 2, the system in accordance with the present invention also generally includes a detector 200 which is operably linked to the sensing station 10 and, if used, control station 100. More particularly, detector 200 is operably linked to first sensor 13 capable for sensing evidence of termites and ambient environmental factors as well as the second sensor 103 capable of sensing ambient environmental factors (of course, sensor 103 could sense evidence of termites as well. However, because termites are excluded from the control station 100, there is no such evidence to sense). The detector 200 in accordance with the present invention may be a conductivity meter, a moisture meter, a pH meter, or a methane gas analyzer and the like. Alternatively, recorders such as strip chart recorders or computers having suitable software could also be used as appropriate detectors and recorders. Sensors 13 and 103 may be operably linked to detector 200 directly through cables 150 and 151 and/or may be linked through other means such as, for example, the use of suitable wireless transmitters and receivers.

In a relatively simple embodiment, and for illustrative purposes only, a single sensing station 10 and a single control station 100 may be linked to a conductivity meter 200. It is also possible to hook up both the sensing station 10 and the control station 100 such that the meter only reads the conductivity difference.

Alternatively, a means for permitting selective detection of evidence of termites and ambient environmental factors from the sensing station 10 and the control station 100 can be used and individual conductivity readings taken for each. Such a means for permitting selective detection of evidence of termites 300 and indeed, ambient environmental factors, can be, for example, a channel selector or multiplexer such as the Campbell Scientific model AM416 relay multiplexer. When using a channel selector, the channel selector would be set so that the conductivity of bait 17 was taken. That conductivity reading would be manually recorded by a meter. See FIG. 1. Then channel selector 300 would be manipulated to select the channel corresponding to control station 100. The conductivity of bait 107 could therefore be determined and recorded. The difference between the readings, if any, would indicate the presence of termites. As shown in FIG. 2, means 300 may also be automated. The stations can be linked to a multiplexer which can, in an automated fashion, select the individual channels as necessary. The multiplexer is then linked to a datalogger such as Campbell Scientific model CR10 which can be set to actuate the multiplexer so as to take reading as often as desired. In fact, the CR10 combines a microcomputer, clock, multimeter, calibrator, scanner, timer, frequency counter, and controller, all in one unit. The datalogger is in turn connected to a computerized data storage system, or a totalizer such as Campbell Scientific model SM192 or SM716, which acts as a data storage device. In such an arrangement, the multiplexer is means 300 and the datalogger/totalizer is detector 200.

At the time of installation, the sensing stations 10 and control stations 100 are calibrated and initialized and the initial readings are recorded. The difference between the initial calibrated reading and the later determined reading is indicative of termites. A difference between the conductivity readings from sensing station 10 and control station 100 is also indicative of the presence of termites. In fact, if the ambient environmental factors stay relatively constant, then the original baseline and subsequent readings at control stations 100 should be about the same.

The control stations 100 also provide an integrity check for the operation of the sensing stations 10. If the control stations read a larger change in conductivity, a higher concentration of gas, or a more pronounced change in pH, then there is reason to question the integrity of the system. This feature is above and beyond their traditional role as a control.

In a preferred embodiment, detector 200 is a computer or a datalogger and totalizer including appropriate software and an appropriate interface. A plurality of sensing stations 10 are disseminated throughout the area of interest and allowed to equilibrate. At least one control station 100 is also utilized. However, in a particularly preferred embodiment, each sensing station 10 has a corresponding control station 100, both of which are disposed adjacent to each other. This assists in ensuring that the ambient environmental conditions and, therefore, the ambient environmental factors, are substantially identical at each test location.

After the proper interfacing between the computer 200 and the various sensing stations 10 and control stations 100, a software program is run and data from each of the sensing stations 10 and corresponding control stations 100 will be obtained. The data from the sensing stations 10 will reflect any evidence of termites which may be present in one or more of the sensing stations 10 along with, as appropriate, one or more of the ambient environmental factors within the first hollow chamber 12 of each of sensing stations 10. The data collected from the control stations 100 will reflect, as appropriate, the levels of one or more ambient environmental factors within chamber 102 of housing 101. However, because termites are denied access to the interior of control stations 100, the data should not reflect any evidence of termites.

By comparing the results and, for example, by subtracting the levels of ambient environmental factors as determined in the control station 100 from the data acquired from the sensing stations 10, and thus factoring out the ambient environmental factors, any additional change is indicative of the presence of termites. An insubstantial difference in conductivity may mean that no termite activity has been determined. A substantial difference in conductivity is indicative of a high level of termite activity. As will be readily apparent, a relative scale of conductivity and termite activity can be generated and the relative size of a population can be estimated based on the conductivity differential. Scales for pH, methane gas and the like can also be established.

The results can be printed up in any number of formats or tables. However, preferably, a map showing the relative location of each of the individual test sites can be printed out along with the appropriate data for each sensing station 10. This map may assist pest control operators in attempting to localize individual termite colonies so that the colonies can be poisoned directly.

The foraging area of termites (the area of actual or potential termite infestation) may, unfortunately, include building and other structures. It may therefore be desirable to install sensing stations 10 and control stations 100 in various locations with the structures in addition to the surrounding acreage. For example, sensing stations 10 and control stations 100 could be installed in crawl spaces, bath traps and dirt filled porches, and anywhere near ground contact where termites are likely to attack. If used in a structure, it would be preferable to ensure that the sensing stations 10 and control stations 100 are oriented in an upright position, just as if they were inserted into the ground as previously described.

In another alternate embodiment in accordance with the present invention, the detector used may be an indicator 200 such as an indicator light or signal which is connected to first sensor 13 in said sensing station 10 and to said second sensor 103 in said control station 100. In this embodiment, the indicator 200, for example, light, is also hooked through a device (not shown) which will only recognize a difference in, for example, the conductivity within sensing station 10 and control station 100. This device could also be designed to register an increase over an initially pre-set calibration value which is set during installation.

In one further embodiment, the indicator 200 will light when any imbalance is detected. In such circumstances, an operator will conduct further testing to determine whether or not the increase in, for example, conductivity has occurred in the sensing station 10 or the control station 100. Increase in conductivity in the sensing station 10 would tend to indicate the presence of termites. An increase in conductivity in the control station 100 would tend to indicate a problem with the set up or operation of those particular stations.

In still another alternate embodiment, the first sensor 13 and second sensor 103 and the indicator 200 are interconnected such that the indicator 200 will only give an indication of an increase in, for example, the conductivity within sensing station 10 over and above the conductivity within control station 100. The various equipment used can be powered by AC and/or DC power sources. The individual sensors can also be powered by small solar cells much like patio lights currently available on the market.

As previously described, a particularly preferred protocol in accordance with the present invention allows for the virtual elimination of on-site travel. The individual sensing stations 10 and control stations 100 are linked to a totalizer or other such device which, automatically and periodically, samples or senses at regular intervals. In the context of conductivity, conductivity measures at each of the sensors would be taken on a periodic basis. Measurements can be taken a fraction of a second apart or days or even weeks apart. In the case of, for example, methane gas, a gas sniffing apparatus with sensing probes in each station would be actuated and methane gas readings taken.

This data can be stored within the totalizer, or transferred to an on-site computer. Alternatively, the totalizer can be linked directly through a modem and phone line to a centralized computer, off-site, which will receive and record the data. If the data is retained by the totalizer or in an on-site computer, then someone at a central location can retrieve the data as needed. This system would virtually eliminate the need for pest control operators to return to the site. In fact, other than for the retrieval and maintenance of equipment, the only reason for an operator to return to the site would be to control a detected infestation or to correct a malfunctioning system. In addition, the use of a totalizer and computer system will allow for more accurate mapping of locations, as more readings can be taken.

In still a further embodiment in accordance with the present invention, a variety of sensing stations 10 can be utilized without a control. Initial readings, such as conductivity measurements, can be taken after the installation of the sensing stations 10 and after time has been allowed for the sensing stations 10 to equilibrate. A plurality of such readings at each sensing station 10 could be used to establish a baseline of, for example, the conductivity of the sensing station 10 as that conductivity is effected by ambient environmental factors alone. Subsequent readings can be taken and increases in conductivity can be detected by comparison of later readings to the prior determined baseline.

In the use of such systems, it may also be advantageous to take external conductivity measurements of the area surrounding each sensing station 10 during subsequent readings so as to verify the continued accuracy of the baseline or so as to adjust the baseline accordingly. These latter steps may be particularly appropriate when the area being monitored or treated is the subject of prolonged dry spells, prolonged wet spells or dramatic changes in temperature. When sensor 13 is, for example, a pH sensor, then it may be particularly necessary to check the continued accuracy of a predetermined baseline after, for example, the surrounding area has been fertilized or treated with lime. The sensing and control stations will also need to be checked if they are old, subject to extreme conditions and the like.

EXAMPLE

The foregoing will be better understood with reference to the following example. The example is for the purpose of illustration and is not to be considered limiting as to the scope and nature of the present invention.

Figure 3:
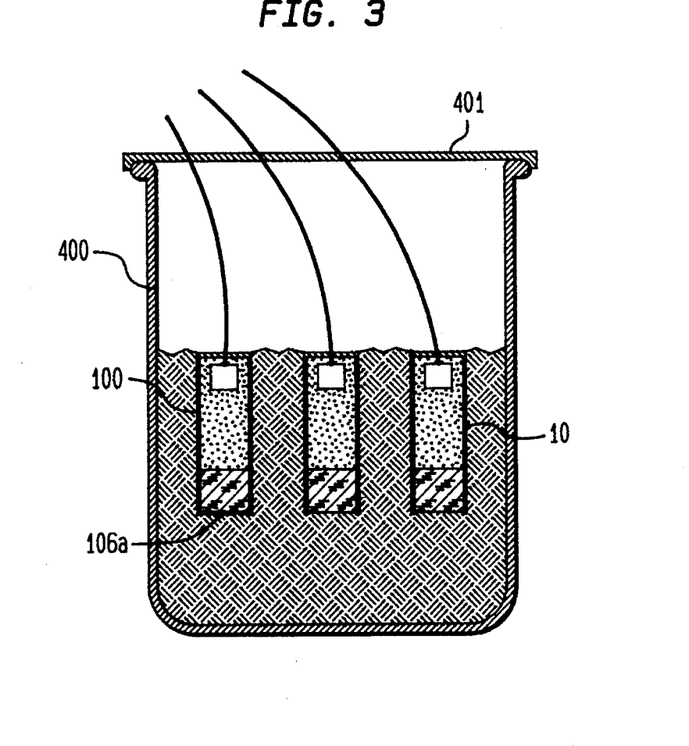
FIG. 3 illustrates the apparatus used in the example from a side view and in cross-section.

A two gallon plastic pail 400 was filled with approximately one gallon of Etowah Silt/Loam at a soil moisture content of approximately 20%. This is considered very moist as the saturation point (field capacity) for this type of soil is approximately 25%. Four sensing stations 10 and one control station 100 were prepared as shown in FIG. 1. Specifically, a HDPE (High Density Polyethylene) open ended vial 1¼ inches in diameter and 3¼ inches in length has a ⅛ inch diameter hole drilled in the center of the closed end. Through this opening, the wire leads for (in this case) a Delmhorst soil moisture block are passed, with the base of the block resting against the end of the vial. The vial opening around the wire leads are then sealed with GE silicone sealant. This sealant both prevents entrance of environmental factors and serves to hold the moisture sensing block in place. After the sealant dries (approx. 24 hrs.), the bait matrix (in this case corn cob grit—14–40 screen size) is added to the vial in an amount sufficient to fully surround and contact both the moisture block and the base of the plug sealing the open end of the vial (in this case a tapered cork). In this case, the optimum amount was approximately 13 grams or 35 cc of grit.

The control station is constructed in an identical manner with the exception of one additional step. After the above process is completed, a section of steel screen mesh with openings less than 5 mm is placed over the entire end of the plugged end of the vial and secured by wiring in place. This allows entrance of ambient environmental factors, yet the mesh size physically prevents entrance of termites and they cannot chew through it.

Various sizes and shapes of sensing stations may be designed based on the ambient factors being measured, the size and species of termite being monitored, the length of desired service life from the sensing station, the frequency of readings being taken and the ambient conditions dictated by the environment in which the stations are placed (hard dry soils allowing only shallow burial for instance or larger stations to accommodate a more voracious termite species).

Each of the five stations were buried in the soil so that the wire lead end of each was flush with the upper surface of the soil. See FIGS. 3 and 4. The container was then resealed with lid 401. The lead wires were run through small holes in the top which were subsequently sealed. A baseline reading was then taken for each station with a Delmhorst model KS-D1 digital soil moisture tester available from Delmhorst Instrument Co. of Towaco, N.J. The stations were allowed to equilibrate for 24 hours and an additional reading was taken to establish a calibration point or baseline upon which to base subsequent moisture increases.

Figure 4:
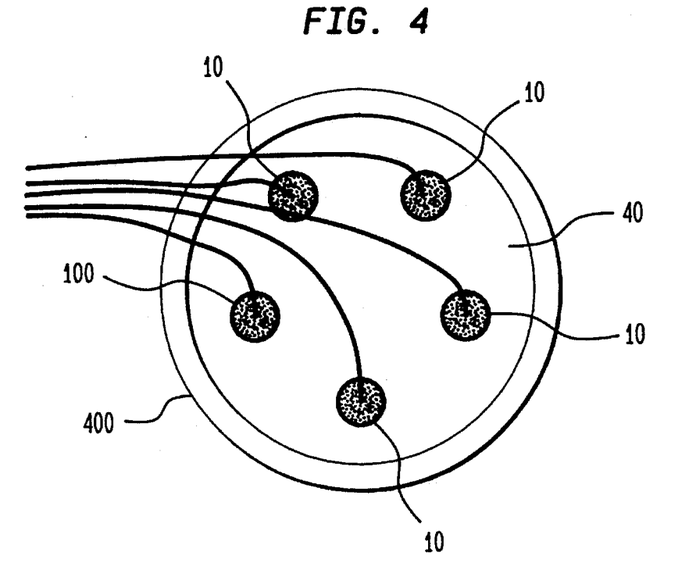
FIG. 4 is a top view of the apparatus illustrated in FIG. 3 with the lid removed.

Thereafter, variable amounts of water were injected through the cork at the bottom end of each sensing station into the sensing station. In the first sensing station, 2 milliliters of water was added. In the second sensing station, 5 milliliters of water was added. In the third sensing station, 10 milliliters of water was added and in the fourth sensing station, 20 milliliters of water was added. The amount of water is indicative of termite feeding activity in each station. The stations were then placed back in the soil and the pail again resealed. Conductivity-based moisture readings were again taken two hours after the sensing stations were placed back in the pail. Second measurements were taken 24 hours later.

EXAMPLES

| Station # | Initial | @24 | H2O | @26 HRS. | @50 HRS. |
|---|---|---|---|---|---|
| 1 | −33.0 | −35.0 | 2 ml | −31.5 | −29.6 |

-continued

| Station # | Initial | @24 | H2O | @26 HRS. | @50 HRS. |
|---|---|---|---|---|---|
| 2 | −33.7 | −35.7 | 5 ml | +96.4 | +96.8 |
| 3 | −33.5 | −35.1 | 10 ml | +99.3 | +99.7 |
| 4 | −33.9 | −35.6 | 20 ml | +99.7 | +99.6 |
| 5 (control) | −34.5 | −36.2 | 0 | −36.2 | −36.2 |

As will be readily apparent, after 24 hours, the sensing stations and control had very similar moisture based resistivity readings. However, upon the addition of moisture to the various sensing stations, relatively rapid changes resulted. Twenty-four hours from the point of moisture introduction, the readings within each station changed dramatically. Even with the introduction of only two milliliters of moisture, the reading at sensing station 1 changed from an initial equilibrated reading of −35.0 to −29.6. This constituted approximately a 20% change in the resistance/conductivity of the grit material when compared to the initial equilibrated reading and a larger increase when compared to the control. At 5 milliliters and above, however, the resistance increased by hundreds of percent, both when compared to the initial equilibrated readings obtained at each station and compared to the control. This test shows both the sensitivity of the present system and the fact that relatively little termite activity can have a noticeable effect on the sensing stations. Therefore, it will be easy for pest control operators to obtain definitive results relatively quickly.

The principles, preferred embodiments, and modes of operation of the present invention have been described in the foregoing specification. The invention which is intended to be protected herein, however, is not to be construed as limited to the particular embodiments disclosed, since these are to be regarded as illustrative rather than restrictive. Variations and changes may be made by others without departing from the spirit and scope of the invention.

I claim:

1. A system for use in the determination and/or control of termite infestation comprising: at least one sensing station including a generally impermeable housing, said housing defining a first hollow inner chamber, a first sensor capable of sensing evidence of termites and ambient environmental factors disposed within said first chamber, a means for allowing termites and ambient environmental factors access into said first chamber, and a bait disposed within said first chamber; and a detector operably linked to said first sensor wherein said first sensor is a moisture sensor, methane gas sensor, or pH sensor.

2. The system of claim 1, further comprising: a plurality of said sensing stations operably linked to said detector.

3. The system of claim 2, further comprising: a means for permitting the selective detection of evidence of termites and ambient environmental factors from each of said sensing stations.

4. The system of claim 1, further comprising a termite active toxicant dispersed within said first chamber of said housing.

5. A system for use in the determination and/or control of termite infestation comprising:

at least one sensing station including a generally impermeable housing, said housing defining a first hollow inner chamber, a first sensor capable of sensing evidence of termites and ambient environmental factors disposed within said first chamber, a means for allowing termites and ambient environmental factors access into said first chamber, a bait disposed within said first chamber;

and a detector operably linked to said first sensor;

said system further comprising at least one control station including a generally impermeable housing, said housing defining a second hollow inner chamber, a second sensor capable of sensing ambient environmental factors disposed within said second chamber, and a means for allowing ambient environmental factors, but not termites, access into said second chamber; and said second sensor being operably linked to said detector.

6. The system of claim 5, further comprising a plurality of said control stations operably linked to said detector.

7. The system of claim 5, wherein said first and said second sensors are moisture sensors, methane gas sensors or pH sensors.

8. The system of claim 7, wherein said moisture sensors are conductivity sensors.

9. The system of claim 5, wherein said detector is a meter, chart recorder, computer, indicator or datalogger.

10. A termite sensing station comprising: a generally impermeable housing, said housing defining a hollow inner chamber, a sensor capable of sensing evidence of termites and ambient environmental factors disposed within said chamber, a means for allowing termites and ambient environmental factors access into said chamber, and a bait disposed within said chamber wherein said sensor is a moisture sensor, a methane gas sensor, or a pH sensor.

11. The sensing station of claim 10, further comprising a termite active toxicant dispersed within said chamber of said housing.

12. A method of detecting an infestation of termites comprising the steps of providing: at least one sensing station including a generally impermeable housing, said housing defining a first hollow inner chamber, a first sensor capable of sensing evidence of termites and ambient environmental factors disposed within said first chamber, a means for allowing termites and ambient environmental factors access into said first chamber, and a bait disposed within said first chamber; providing at least one control station including a generally impermeable housing, said housing defining a second hollow inner chamber, a second sensor capable of sensing ambient environmental factors disposed within said second chamber, and a means for allowing ambient environmental factors, but not termites, access into said second chamber; exposing said at least one sensing station and said at least one control station to an area of suspected or possible termite infestation detecting and analyzing physical changes within said first hollow chamber; detecting and analyzing physical changes within said second hollow chamber; and determining said physical changes due to other than ambient environmental factors.

13. The method of claim 12, wherein the physical changes detected are selected from the group consisting of changes in moisture content, changes in the gas content, changes in pH, changes in conductivity, or changes in resistivity.

14. The method of claim 13, wherein said moisture content is measured by use of a conductivity sensor.

15. A method of detecting an infestation of termites comprising the steps of: providing at least one sensing station including a generally impermeable housing, said housing defining a first hollow inner chamber, a first sensor capable of sensing evidence of termites and ambient environmental factors disposed within said first chamber, a means for allowing termites and ambient environmental factors access into said first chamber and a bait disposed within said first chamber; detecting and analyzing physical changes within the first hollow chamber and comparing the degree of said physical changes within said first hollow chamber to a baseline of ambient environmental factors, wherein said first sensor is capable of detecting changes in pH, changes in conductivity, changes in resistivity, changes in gas content or changes in moisture content.

16. A system for use in the determination and/or control of termite infestation comprising: a plurality of sensing stations, each station including a generally impermeable housing, said housing defining a first hollow inner chamber, a first sensor capable of sensing evidence of termites and ambient environmental factors disposed within said first chamber, a means for allowing termites and ambient environmental factors access into said first chamber, and a bait disposed within said first chamber; a detector operably linked to said first sensor; a plurality of control stations, each control station including a generally impermeable housing, said housing of said control station defining a second hollow inner chamber, a second sensor capable of sensing ambient environmental factors disposed within said second chamber, and a means for allowing ambient environmental factors, but not termites, access into said second chamber; said second sensor being operably linked to said detector.

17. The system of claim 16, wherein said first and said second sensors are moisture sensors, methane gas sensors or pH sensors.

18. The system of claim 17, wherein said moisture sensors are conductivity sensors.

19. The system of claim 16, wherein said detector is a meter, chart recorder, computer, indicator or datalogger.

* * * * *